United States Patent
Takata (10) Patent No.: US 8,134,626 B2
(45) Date of Patent: Mar. 13, 2012

(54) SOLID-STATE IMAGING DEVICE, METHOD OF DRIVING A SOLID-STATE IMAGING DEVICE, AND IMAGING APPARATUS

(75) Inventor: Takuya Takata, Kanagawa (JP)

(73) Assignee: Fujifilm Corporation (JP)

( * ) Notice: Subject to any disclaimer, the term of this patent is extended or adjusted under 35 U.S.C. 154(b) by 170 days.

(21) Appl. No.: 12/730,615

(22) Filed: Mar. 24, 2010

(65) Prior Publication Data

US 2010/0245641 A1 Sep. 30, 2010

(30) Foreign Application Priority Data

Mar. 27, 2009 (JP) .................................. 2009-080268

(51) Int. Cl.
*H04N 3/14* (2006.01)
*H04N 5/335* (2011.01)
*H01L 31/062* (2006.01)
*H01L 31/113* (2006.01)
*H01L 27/00* (2006.01)

(52) U.S. Cl. ...................... 348/308; 257/291; 250/208.1
(58) Field of Classification Search .................. 348/294, 348/296, 308; 257/290–292; 250/208.1
See application file for complete search history.

(56) References Cited

U.S. PATENT DOCUMENTS

| 2002/0089594 | A1* | 7/2002 | Ishimoto | 348/296 |
| 2005/0117041 | A1* | 6/2005 | Tsukamoto | 348/294 |
| 2006/0001754 | A1 | 1/2006 | Yanagisawa et al. | |
| 2007/0058057 | A1* | 3/2007 | Futamura | 348/294 |
| 2007/0285544 | A1* | 12/2007 | Yamada et al. | 348/294 |
| 2009/0073294 | A1* | 3/2009 | Morimoto | 348/300 |

FOREIGN PATENT DOCUMENTS

JP 2001-218119 A 8/2001
JP 2006-019971 A 1/2006

* cited by examiner

*Primary Examiner* — Kelly L Jerabek
(74) *Attorney, Agent, or Firm* — Studebaker & Brackett PC; Donald R. Studebaker (57) ABSTRACT

A solid-state imaging device includes, on a substrate, a lower electrode, a photoelectric converting layer that is disposed on the lower electrode, and an upper electrode that is disposed on the photoelectric converting layer. The device further includes: a boosting unit which is formed in the substrate, and which supplies a power supply voltage for producing an electric field between the upper electrode and the lower electrode; a wiring portion which electrically connects the output of the boosting unit to the upper electrode; and a low-pass filter which is connected to the output of the boosting unit, and which includes a resistor that is formed by at least a part of the wiring portion.

17 Claims, 6 Drawing Sheets

SOLID-STATE IMAGING DEVICE, METHOD OF DRIVING A SOLID-STATE IMAGING DEVICE, AND IMAGING APPARATUS

The present application claims priority from Japanese Patent Application No. 2009-080268 filed on Mar. 27, 2009, the entire content of which is incorporated herein by reference.

BACKGROUND OF INVENTION

1. Field of the Invention

The present invention relates to a solid-state imaging device, a method of driving a solid-state imaging device, and an imaging apparatus.

2. Description of the Related Art

Usually, in order to operate a CMOS image sensor, a high voltage which exceeds the power supply voltage of the sensor is required. As a power supply which generates such a high voltage, a charge pump type boost circuit which can be miniaturized in a relatively easy manner, and which can be easily formed as an IC to incorporate such a sensor is often used.

In the case of the charge pump type, however, an image quality problem is principally caused by noises due to a pumping operation in which boosting is performed by an input of a clock signal. Noises which are synchronized with a pumping clock frequency of about several hundreds of kHz (200 kHz to 1 MHz) are generated.

In a CMOS sensor which is disclosed in JP-2006-19971 below, during a process of correlation double sampling, the pumping operation of a charge pump is inhibited, whereby the output from a source of generating a pumping clock signal is nulled. In this case, the pumping operation is temporarily stopped, and hence the image quality is affected by lowering of the power supply voltage of the sensor.

JP-2001-218119 below discloses a technique of, in a CCD imaging device, avoiding noises due to a phenomenon in which a boost clock signal enters an imaging signal. In the disclosed patent, using a period when the output of the imaging signal from a CCD image sensor is stopped (i.e., the horizontal blanking period or the like), the timing of a timing generating portion is set so as to apply a boost clock signal from a timing generating circuit to a controlling portion (i.e., so as to perform the pumping operation). In the case where the technique disclosed in JP-2001-218119 is applied to a solid-state imaging device such as a CMOS image sensor, however, the charge pump operation is performed in the blanking period which is a period of the CDS (correlation double sampling) operation that is most important in the pixel reading operation, with the result that the image quality is affected.

In a method of suppressing power supply noises, a low-pass filter (LPF) can be used. A low-pass filter includes a capacitor (C) and a resistor (R). When the capacitance of the capacitor is increased, the size becomes large, and a large area is occupied. In the case of external provision, the number of components to be mounted is increased, thereby impeding the miniaturization of an optical device. When the resistance R is made higher, a large voltage drop due to a current consumed by a sensor occurs. When CR is made small to raise the cutoff frequency of the LPF, the frequency is higher than the operating frequency of the charge pump system, and noises cannot be blocked.

Today, a configuration of a solid-state imaging device of the photoelectric converting layer stacking type in which a photoelectric converting layer containing an organic material that produces charges in accordance with incident light is disposed above a semiconductor substrate is proposed as a novel imaging system. The configuration is excellent in that, when the photoelectric converting layer having a high photoelectric conversion efficiency is placed on a reading circuit of a CMOS structure or the like, the imaging device can be thinned, and the aperture ratio and the sensitivity can be made high. Furthermore, the power consumption is low (the consumption current: several tens of μA), and therefore the configuration is excellent also in the feature that it is suitable for a small camera in a portable module and the like.

In a solid-state imaging device of the photoelectric converting layer stacking type, similarly with a conventional solid-state imaging device, a high voltage (about 3.3 V to 40 V) which exceeds the power supply voltage (usually, about 3.3 V) of a sensor is usually required in order to ensure a high image quality. The use of a boost circuit as a power supply for generating a high voltage has been studied so that such a high voltage is supplied. However, the image quality is inevitably reduced by power supply noises due to the operation of the boost circuit. When a low-pass filter is simply introduced in order to suppress power supply noises, however, the size of an IC chip including a solid-state imaging device of the photoelectric converting layer stacking type is increased. Therefore, the novel configuration has room for improvement.

SUMMARY OF INVENTION

The invention provides a solid-state imaging device, method of driving a solid-state imaging device, and imaging apparatus in which a high voltage may be supplied, reduction of the image quality due to power supply noises may be suppressed, and the size of an IC chip including a solid-state imaging device may be reduced.

(1) According to an aspect of the invention, a solid-state imaging device which is disposed on a substrate includes; a lower electrode; a photoelectric converting layer that is disposed on the lower electrode; an upper electrode that is disposed on the photoelectric converting layer; a boosting unit that supplies a power supply voltage for producing an electric field between the upper electrode and the lower electrode; a wiring portion that electrically connects the output of a boosting unit to the upper electrode; and a low-pass filter that is connected to the output of the boosting unit, and that includes a resistor that is formed by at least a part of the wiring portion.

(2) In the solid-state imaging device of (1), the substrate provides a sensor region including the photoelectric converting layer and a peripheral region where the sensor region is not disposed, and the boosting unit and the low-pass filter are disposed in the peripheral region.

(3) In the solid-state imaging device of (1), the wiring portion is formed into a meander line shape.

(4) In the solid-state imaging device of (1), the wiring portion includes a plurality of parallel flat plates which are electrically connected to one another, and which have gaps in a vertical direction of the substrate, and the plurality of parallel flat plates configure a capacitor of the low-pass filter.

(5) The solid-state imaging device of (1) may further include: a voltage detecting unit that detects a power supply voltage output from the boosting unit; and a controlling portion that sets a clock frequency of the boosting unit so that the voltage detected by the voltage detecting unit is within a range, and that controls the clock frequency.

(6) In the solid-state imaging device of (1), the wiring portion is made of a material having a resistivity of $1\times10^{-7}$ Ωm or more.

(7) In the solid-state imaging device of (1), the wiring portion is made of titanium nitride or indium tin oxide.

(8) In the solid-state imaging device of (1), the wiring portion is configured by a same conductive material as the lower electrode. (9)

According to an aspect of the invention, a method of driving a solid-state imaging device which, on a substrate, includes a lower electrode, a photoelectric converting layer that is disposed on the lower electrode, and an upper electrode that is disposed on the photoelectric converting layer, the method comprising; controlling a clock frequency of a boosting unit by a low-pass filter in the substrate, wherein the low-pass filter includes a resistor that is formed by at least a part of a wiring portion which electrically connects an output of the boosting unit to the upper electrode: supplying a power supply voltage by the boosting unit in order to produce an electric field between the upper electrode and the lower electrode: and entering a light from an upper side of the upper electrode.

(10) In the method of (9), the substrate has a sensor region including the photoelectric converting layer and a peripheral region where the sensor region is not disposed, and the boosting unit, and the low-pass filter are disposed in the peripheral region.

(11) In the method of (9), the wiring portion is formed into a meander line shape.

(12) In the method of (9), the wiring portion includes a plurality of parallel flat plates which are electrically connected to one another, and which have gaps in a vertical direction of the substrate, and the plurality of parallel flat plates configure a capacitor of the low-pass filter.

(13) The method of (9) may further include: detecting the power supply voltage output from the boosting unit; setting the clock frequency so that the detected voltage is within a range; and controlling the clock frequency.

(14) In the method of (9), the wiring portion is made of a material having a resistivity of $1 \times 10^{-7}$ Ωm or more.

(15) In the method of (9), the wiring portion is made of titanium nitride or indium tin oxide.

(16) In the method of (9), the wiring portion is configured by a same conductive material as the lower electrode.

(17) According to an aspect of the invention, an imaging apparatus which includes a solid-state imaging device according to (1).

According to the invention, a high power supply voltage may be supplied to the upper and lower electrodes by the boosting unit, and power supply noises caused by a boosting operation may be suppressed by the low-pass filter. The low-pass filter has the configuration where a part of the wiring portion which electrically connects the output of the boosting unit to the upper electrode is formed as a resistor, and hence may be incorporated in the same substrate. As compared with the case where a low-pass filter is disposed outside a substrate, therefore, the size of an IC chip including a solid-state imaging device may be reduced.

According to the solid-state imaging device of the invention, a high voltage may be supplied, reduction of the image quality due to power supply noises may be suppressed, and the size of an IC chip including a solid-state imaging device may be reduced.

DESCRIPTION OF EXEMPLARY EMBODIMENTS

Figure 1:
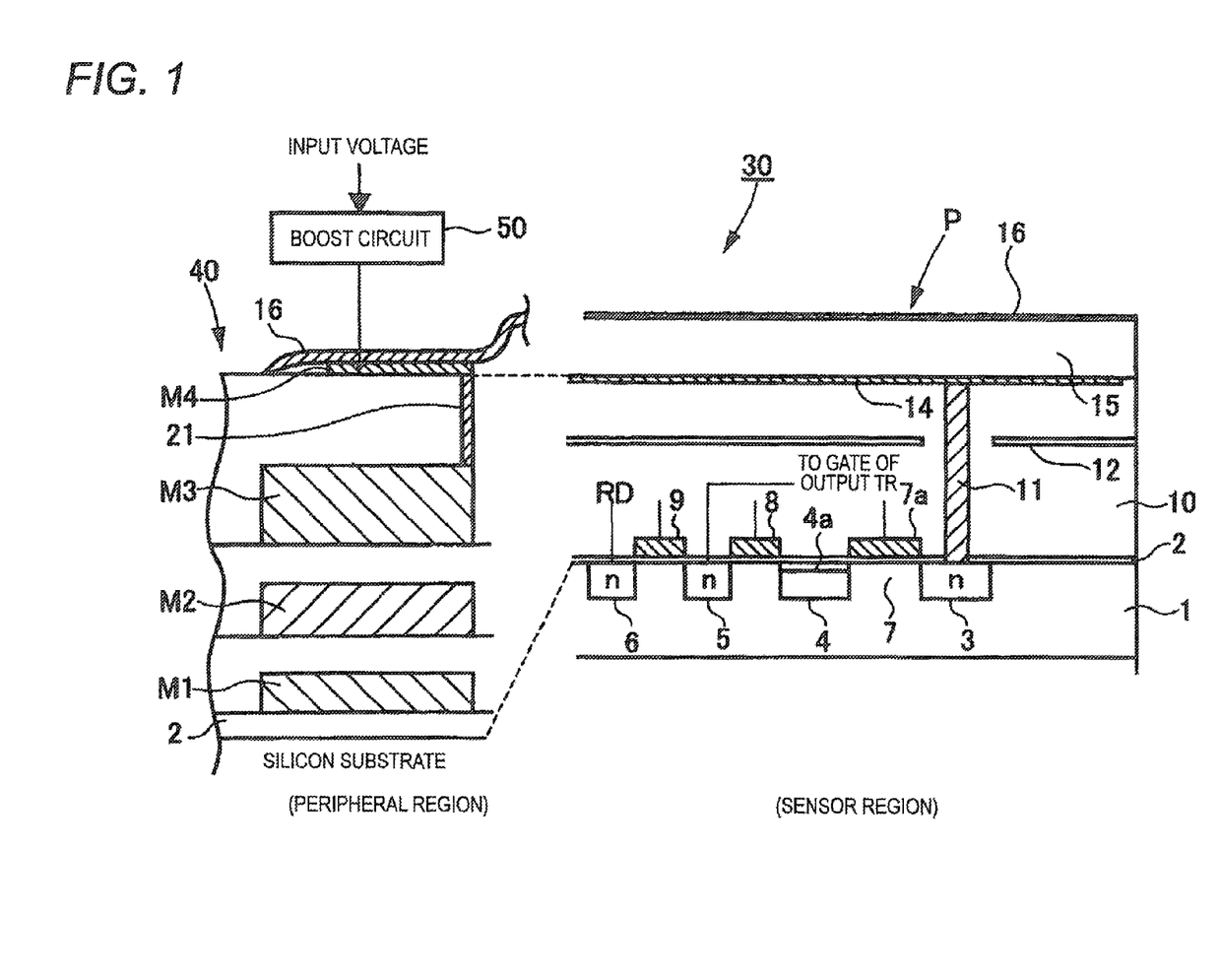
FIG. 1 is a sectional diagram of a pixel portion of a solid-state imaging device and its peripheral portion.
Figure 2:
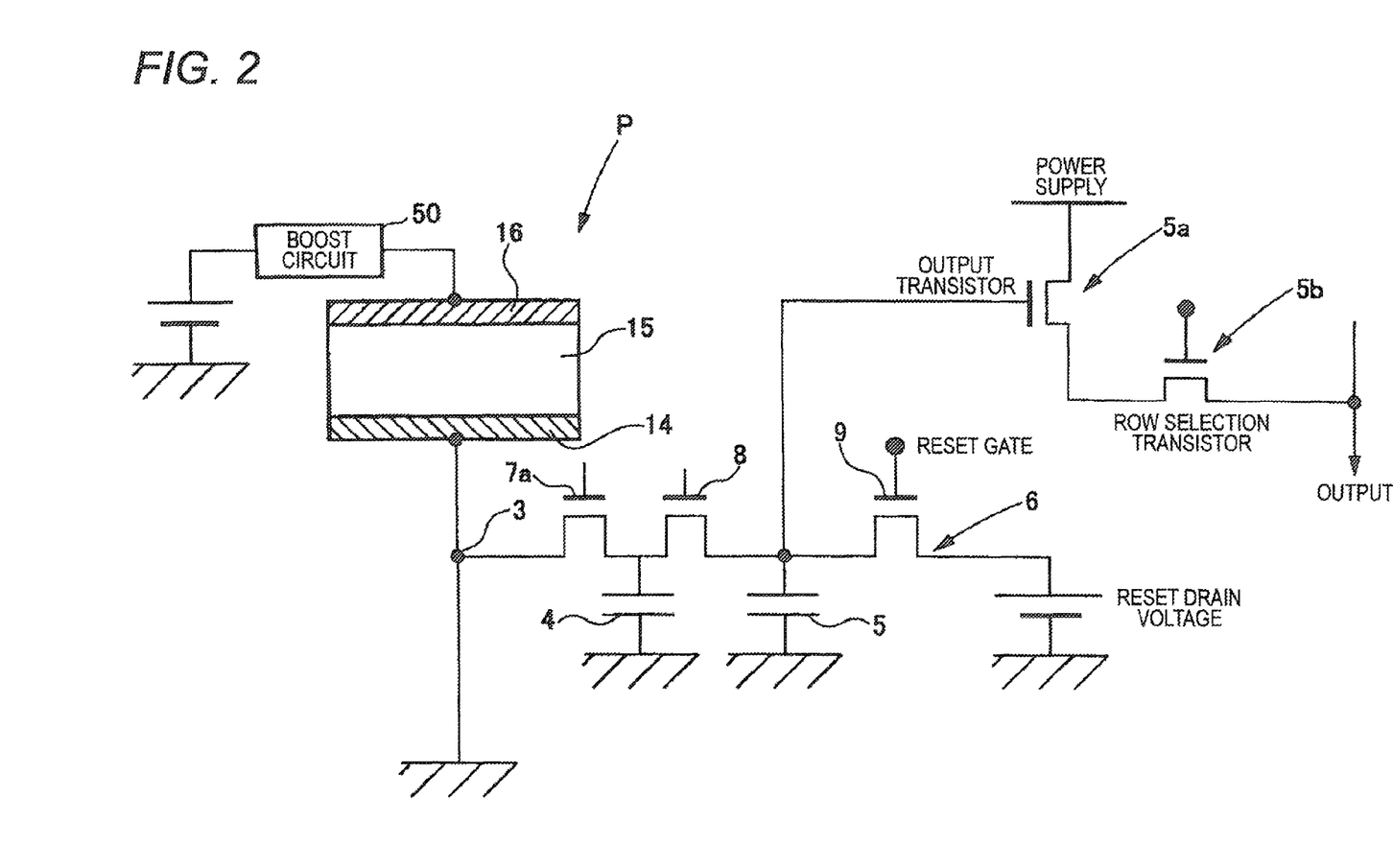
FIG. 2 is a diagram showing an equivalent circuit of the pixel portion.

FIG. 1 is a sectional diagram of one pixel of a solid-state imaging device, and FIG. 2 is a diagram showing an equivalent circuit of the one pixel shown in FIG. 1. The solid-state imaging device of the embodiment has a configuration where the one pixel shown in FIG. 1 is arranged in a plural number one- or two-dimensionally on the same plain.

The solid-state imaging device shown in FIG. 1 includes a p-type silicon substrate 1 (hereinafter, referred to as substrate 1) which is a semiconductor substrate, and a photoelectric converting element P which is stacked above the substrate 1 through a gate insulating film 2 and an insulating layer 10.

The photoelectric converting element P has a configuration including a lower electrode 14 which is formed on the insulating layer 10, a photoelectric converting layer 15 which is formed on the lower electrode 14, and an upper electrode 16 which is formed on the photoelectric converting layer 15.

On the upper electrode 16, incident light from an object is incident from the upper side of the electrode. It is necessary to cause the incident light to be incident on the photoelectric converting layer 15. Therefore, the upper electrode 16 is configured by a conductive material which is transparent to the incident light, such as ITO (indium tin oxide). The upper electrode 16 is configured by one electrode which is common to all the pixels. Alternatively, the upper electrode may be divided for each pixel.

The lower electrode 14 is configured by a conductive material (ITO (indium tin oxide), aluminum, or the like) which is a thin film divided for each pixel, and which is transparent or opaque.

The photoelectric converting layer 15 is a layer configured by an organic or inorganic photoelectric converting material which absorbs a specific wavelength region of incident light, and which generates charges corresponding to the absorbed light quantity. When the photoelectric converting layer 15 is configured by a photoelectric converting material (for example, quinacridone) which absorbs light of the green wavelength region, and which generates charges corresponding to the absorption, a monochrome imaging for visible light is enabled. When the photoelectric converting layer 15 is configured by a photoelectric converting material (for example, a phthalocyanine organic material, or a naphthalocyanine organic material) which absorbs light of the infrared wavelength region, and which generates charges corresponding to the absorption, a monochrome imaging for infrared light is enabled.

In the substrate 1, a connection region 3 which is electrically connected to the lower electrode 14, and which is formed by an n-type impurity layer is disposed. The connection region 3 and the lower electrode 14 are connected to each other by a contact wiring 11 which is embedded in the gate insulating film 2 and the insulating layer 10, and which is made of a conductive material.

On the left side of the connection region 3, a potential barrier portion 7 which is formed by a part of the p-substrate is disposed. The potential barrier portion 7 functions as a potential barrier unit which is a potential barrier with respect to the connection region 3.

On the left side of the potential barrier portion 7, a first charge accumulating portion 4 for accumulating charges which are moved from the contact wiring 11 to the connection region 3 and then reaches the portion through the potential barrier portion 7 is disposed. The first charge accumulating portion 4 is configured by an n-type impurity layer which has the same conductivity type as the connection region 3.

A p-type impurity layer 4a which is formed by implanting a p-type impurity having the conductivity type opposite to that of the first charge accumulating portion 4 is formed in the surface of the first charge accumulating portion 4. Since the p-type impurity layer 4a is formed in the surface of the first charge accumulating portion 4, a so-called embedded type in which the first charge accumulating portion 4 is disposed not in the outermost layer of the substrate but inside the substrate is formed, and charges are accumulated inside the substrate. As a result, mixing of a dark current which is generated in the surface of substrate may be suppressed, and the S/N ratio may be improved. When the first charge accumulating portion 4 is completely depleted by adjusting the impurity concentrations of the first charge accumulating portion 4 and the p-type impurity layer 4a, the so-called complete transfer is enabled.

A gate electrode 7a of a transistor in which the connection region 3 is set as the source, and the first charge accumulating portion 4 is set as the drain is disposed above the potential barrier portion 7 through the gate insulating film 2. A fixed voltage is applied from the outside to the gate electrode 7a. Hereinafter, the gate electrode 7a is referred to as the barrier gate 7a.

On the left side of the first charge accumulating portion 4, a second charge accumulating portion 5 is disposed while being slightly separated therefrom. The second charge accumulating portion 5 is configured by an n-type impurity layer which has the same conductivity type as the connection region 3.

Above the substrate 1 and between the first charge accumulating portion 4 and the second charge accumulating portion 5, a gate electrode 8 of a transistor in which the first charge accumulating portion 4 is set as the source, and the second charge accumulating portion 5 is set as the drain is disposed through the gate insulating film 2. The gate electrode 8 functions as a charge transferring unit which transfers charges accumulated in the first charge accumulating portion 4 to the second charge accumulating portion 5. Hereinafter, the gate electrode 8 is referred to as the transfer gate 8. When a charge transfer pulse of a high voltage is applied to the transfer gate 8, charges accumulated in the first charge accumulating portion 4 are transferred to the second charge accumulating portion 5. Preferably, the first charge accumulating portion 4 is completely depleted. When such depletion is performed, charges in the first charge accumulating portion 4 are completely transferred to the second charge accumulating portion 5.

On the left side of the second charge accumulating portion 5, a reset drain 6 configured by an n-type impurity layer which has the same conductivity type as the connection region 3 is disposed while being slightly separated therefrom.

Above the substrate 1 and between the second charge accumulating portion 5 and the reset drain 6, a gate electrode (hereinafter, referred to as a reset gate) 9 of a reset transistor in which the second charge accumulating portion 5 is set as the source, and the reset drain 6 is set as the drain is disposed through the gate insulating film 2. When a reset pulse of a high voltage is applied to the gate electrode 9, charges accumulated in the second charge accumulating portion 5 are discharged to the reset drain 6.

On the substrate 1, a known signal output circuit configured by a MOS transistor which outputs a signal corresponding to charges accumulated in the second charge accumulating portion 5 is disposed for each pixel. The signal output circuit includes also the reset transistor.

As shown in FIG. 2, the signal output circuit includes an output transistor 5a and a row selection transistor 5b in addition to the reset transistor. In the output transistor 5a, the gate is connected to the second charge accumulating portion 5, the drain is connected to the power supply, and the source is connected to the drain of the row selection transistor 5b. The output transistor 5a outputs a voltage signal corresponding to the amount of charges accumulated in the second charge accumulating portion 5.

When a row selection pulse is applied to the gate, the row selection transistor 5b outputs the voltage signal output from the output transistor 5a, to an output signal line. The row selection pulse is applied sequentially to the rows of the signal output circuits respectively disposed for the pixels, whereby a signal is output from the all pixels.

Figure 3:
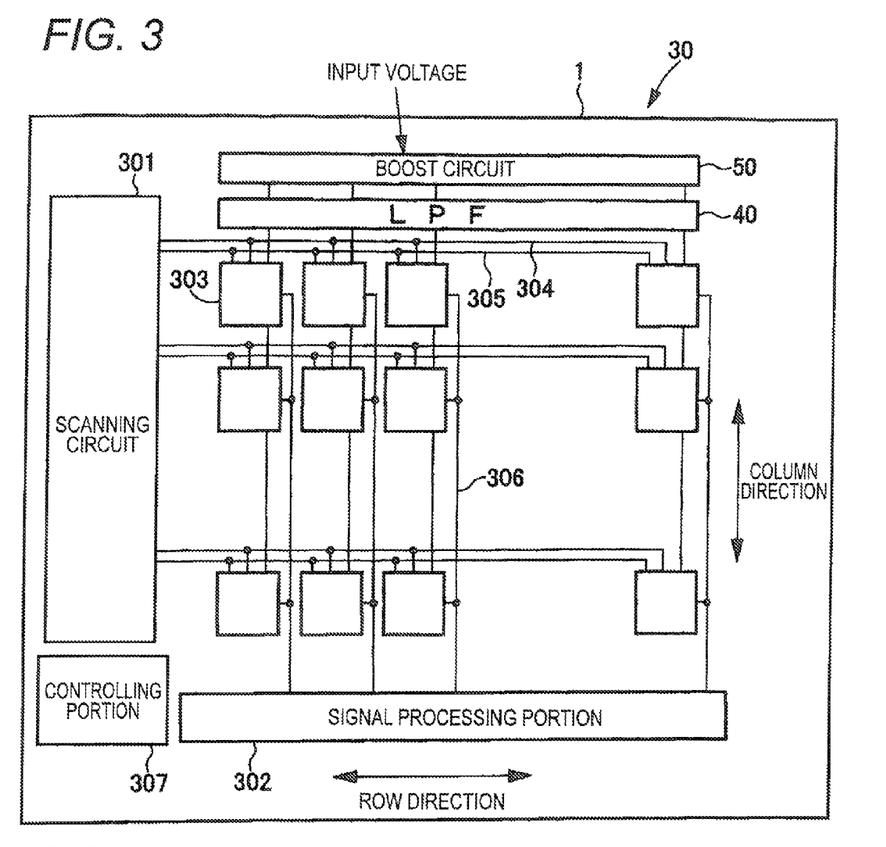
FIG. 3 is a plan diagram of the solid-state imaging device.

FIG. 3 is a plan diagram of the solid-state imaging device.

The solid-state imaging device 30 includes: a large number of pixels 303 which are arranged in a square lattice pattern in the row direction and the column direction perpendicular to the row direction; a scanning circuit 301 which controls the reading of signals from the pixels 303; a signal processing portion 302 which processes the signals output from the pixels 303; and a controlling portion 307 which controls the various portions. The pixels 303 have the configuration shown in FIG. 1.

The scanning circuit 301 is connected to the reset gates 9 of the reset transistors of the pixels 303 through reset signal lines 304, to apply the reset pulse to the pixels 303 through the reset signal lines 304. Furthermore, the scanning circuit 301 is connected to the gates of the row selection transistors 5b of the pixels 303 through row selection signal lines 305, to apply the row selection pulse to the pixels 303 through the row selection signal lines 305.

The signal processing portion 302 is connected to the outputs of the row selection transistors 5b of the pixels 303 through output signal lines 306, so that signals output from the row selection transistors 5b are input into the signal processing portion 302 through the output signal lines 306. The signal processing portion 302 performs signal processing on each line. Therefore, the scanning circuit 301 performs the rolling read control in which the signals from the pixels 303 are sequentially output in the unit of one line.

The solid-state imaging device 30 further includes: a boost circuit 50 which performs a boosting operation to boost the input voltage, and which supplies the power supply voltage to the photoelectric converting element P of each of the pixels 303; and a low-pass filter 40 which suppresses power supply noises contained in the power supply voltage of the boost circuit 50.

Figure 4:
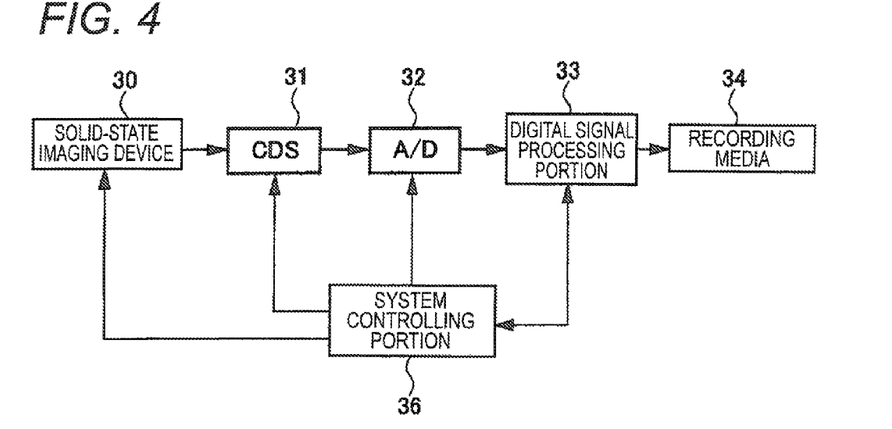
FIG. 4 is a diagram showing a configuration example of an imaging apparatus on which the solid-state imaging device is mounted.

FIG. 4 is a diagram showing a configuration example of an imaging apparatus on which the solid-state imaging device is mounted.

The imaging apparatus shown in FIG. 4 includes: a CDS circuit 31 which applies a process of correlation double sampling (CDS) on the signal obtained from each pixel of the solid-state imaging device 30, to remove reset noises; an A/D converter 32 which converts an output signal of the CDS circuit 31 to a digital signal; a digital signal processing portion 33 which applies predetermined digital signal processing on the digital signal output from the A/D converter 32, to produce image data; a recording media 34 into which the image data produced by the digital signal processing portion 33 are recorded; and a system controlling portion 36 which generally controls the whole imaging apparatus. The solid-state imaging device 30, the CDS circuit 31, and the A/D converter 32 may be incorporated into one chip (one IC).

A sensor region where the plurality of pixels including the photoelectric converting elements P are regularly arranged, and a peripheral region where the sensor region is not disposed are formed in the surface of the substrate 1. The low-pass filter 40 and the boost circuit 50 are disposed in the peripheral region.

As shown in FIG. 1, in the peripheral region of the substrate 1, parallel flat plates M1 to M3 which are disposed in the insulating layer 10 above the substrate 1, and which are configured by a plurality of conductive materials are disposed in parallel. The parallel flat plates M1 to M3 are electrically connected to one another through vias or the like which are not shown. In accordance with necessity in the circuit configuration, the parallel flat plates M1 to M3 are electrically connected to one another. Therefore, all of the flat plates are required to be connected to one another, and only selected ones of the flat plates may be appropriately connected to each other.

For example, the parallel flat plate M1 is formed at a predetermined thickness on the gate insulating film 2. The parallel flat plate M2 is disposed on the parallel flat plate M1 through a part of the insulating layer 10. The parallel flat plate M3 is disposed on the parallel flat plate M2 through a part of the insulating layer 10 of a predetermined thickness.

A wiring portion M4 is disposed on the parallel flat plate M3 which is located in the uppermost portion among the parallel flat plates M1 to M3. The wiring portion M4 is electrically connected to the parallel flat plate M3 through a connecting portion 21. A part of the upper electrode 16 on the side of the sensor region is extended toward the peripheral region so that the upper electrode 16 and the wiring portion M4 are electrically connected to each other in the peripheral region. The wiring portion M4 is electrically connected also to the output of the boost circuit 50. Each of the parallel flat plates M1 to M3 functions as an electrode of a capacitor, and a capacitor capacitance is disposed in each of the gaps between the parallel flat plates M1 to M3.

For example, the wiring portion M4 is disposed on the parallel flat plate M3 through a part of the insulating layer 10 of a predetermined thickness.

In the peripheral region, the parallel flat plates M1 to M3 and the wiring portion M4 are stacked to one another above the substrate 1 while forming gaps therebetween. A solid-state imaging device of the photoelectric converting layer stacking type has a configuration where other electrodes and wirings are not required to be disposed above the semiconductor substrate in the peripheral region. Therefore, the parallel flat plates M1 to M3 and the wiring portion M4 are disposed in the portion, thereby enabling the low-pass filter 40 to be incorporated in the same semiconductor substrate without affecting the design of other components of the solid-state imaging device 30.

The parallel flat plates M1 to M3 and the wiring portion M4 may be formed in the same production step while using a conductive material identical with that of wiring layers of the photoelectric converting elements P and a circuit for reading out charges of the photoelectric converting elements P.

For example, the wiring portion M4 may be configured by the same conductive material as the lower electrode 14 of the photoelectric converting elements P. In this case, the wiring portion M4 and the lower electrode 14 are located at the same position from the surface of the substrate 1.

The wiring portion M4 may be configured by using a predetermined metal material (top metal) which is located in the uppermost portion of the peripheral region of the semiconductor substrate. In the top metal, as a material which may be connected, without being oxidized, to ITO (indium tin oxide) or the like configuring the upper electrode, TiN (titanium nitride) is used in place of Au (gold), Al (aluminum), and Cu (copper). When a high-resistivity material such as TiN is used, the wiring portion M4 may be formed in a length by which the wiring length of a resistor may be realized. Preferably, the material configuring the wiring portion M4 has a resistivity of $1 \times 10^{-7}$ $\Omega$m or more.

Figure 5:
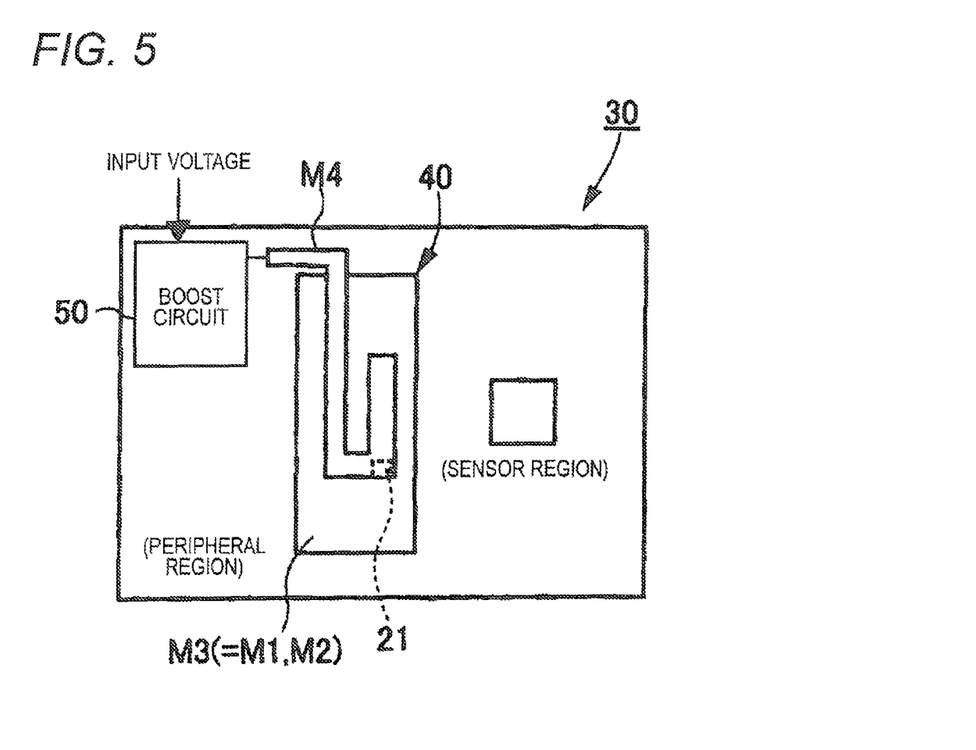
FIG. 5 is a plan diagram showing an example of the configuration of a wiring portion.

FIG. 5 is a plan diagram showing an example of the configuration of the wiring portion. As shown in FIG. 5, in order to attain a high resistance, the wiring portion M4 has a shape in which a long dimension is formed in the current flowing direction, and the section in the current flowing direction is small. The shape of the wiring portion M4 is deformable within the range where a high resistance may be ensured.

The low-pass filter 40 includes a capacitor which is formed by the parallel flat plates M1 to M3, and a resistor which is formed by at least a part of the wiring portion M4.

The capacitor is configured by the MIM (Metal: capacitor insulating film (Insulator): Metal) structure or the like, in the semiconductor substrate, and suppressed to a low capacitance of several tens of pF which may be realized in the semiconductor substrate. Alternatively, the wiring portion M4 may be used as a top metal, and a capacitor may be configured by the wiring portion M4 and the parallel flat plate M3 (or the parallel flat plate M2 or the parallel flat plate M1). The electrostatic capacitance may be adequately changed not only by varying the areas of the parallel flat plates M1 to M3, but also by varying their thicknesses.

Figure 6:
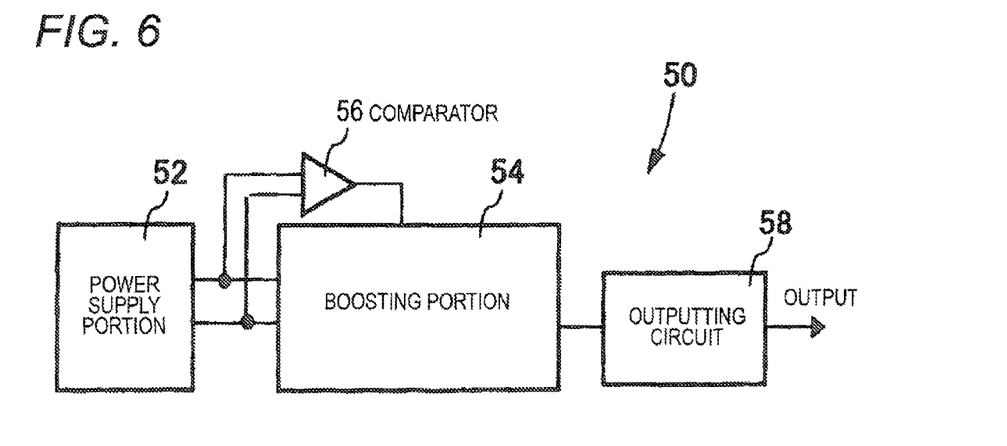
FIG. 6 is a diagram showing an example of the configuration of a boost circuit.

FIG. 6 is a diagram showing an example of the configuration of the boost circuit. As the boost circuit 50, for example, a charge pump type boost circuit is used. The charge pump type boost circuit includes: a boosting portion 54; a power supply portion 52 which supplies a reference voltage for producing a boosted voltage, to the boosting portion 54; an outputting circuit 58 which outputs the boosted voltage; and a comparator 56. In the boosting portion 54, a plurality of charging capacitors, and a boosting switch which switches over the charging capacitors are disposed. During the boosting operation, the boosting switch of the boosting portion 54, and a switch of the outputting circuit are driven on the basis of the clock frequency of a clock signal output from an oscillator. Then, the plurality of charging capacitors disposed in the boosting portion 54 perform charging and discharging operations. As a result, the boosted voltage is produced in the boosting portion 54, and the boosted voltage is output.

The capacitor which functions as the plurality of charging capacitors in the boosting portion 54 is formed by the parallel flat plates of conductive materials or the like in the peripheral region of the substrate 1. According to the configuration, the boosting portion 54 may be formed in the substrate 1 to function as a boosting unit. The power supply portion 52, comparator 56, and outputting circuit 58 of the boost circuit 50 may be configured in the peripheral region of the substrate 1 on the side of the IC chip including the solid-state imaging device 30. Alternatively, the boost circuit 50 may be disposed on the side of the IC chip including the solid-state imaging device 30, and only the boosted power supply voltage may be supplied to the solid-state imaging device 30.

In the solid-state imaging device 30, power supply noises due to the boosting operation may be suppressed by the low-pass filter 40 in which the part of the wiring portion M4 disposed between the boost circuit 50 and the photoelectric converting layer 15 is formed as a resistor. By taking the advantage of low current consumption which is one of the features of a CMOS image sensor of the photoelectric converting layer stacking type, therefore, the voltage may be always applied.

In the case where the solid-state imaging device 30 is operated at a voltage of 10 V and a current of 2 μA, for example, it is assumed that, in the boosting operation of the boost circuit 50, the clock frequency is 200 kHz and the consumption current is 2 μA. At this time, noises of several tens of mVpp due to the clock frequency of 200 kHz are generated. When the cutoff frequency of the LPF which suppresses noises to several mVpp is 15 kHz, the resistor (R) of the low-pass filter is 330 kΩ, and the capacitor (C) is 33 pF. When the material of the wiring portion is configured by a film of TiN, the wiring length is about 1.5 mm according to the resistivity. At this time, the voltage drop is about 0.66 V. The VGA (640×480) in which the pixel size is 3 μm×3 μm has a size of 1.92 mm×1.44 mm, and it will be seen that the wiring length is sufficient.

In an example of calculation of the electrostatic capacitance between the wiring portion M4 and the parallel flat plate M3, when the parallel flat plates M3, M4 have a size of 0.6 mm×0.96 mm, the interval between the wiring portion M4 and the parallel flat plate M3 is 650 nm, and the specific dielectric constant between the wiring portion M4 and the parallel flat plate M3 is 4.2, the capacitor may be calculated as Capacitor (C)=4.2×∈0 (the dielectric constant of vacuum)×0.96×0.6/(650×10$^{-9}$)=33 pF.

The solid-state imaging device 30 of the photoelectric converting layer stacking type has the feature that the photoelectric converting layer 15 is disposed above the substrate 1. Also from the viewpoint that the feature is used, it is preferred to form the wiring portion by using a top metal region serving as the resistor of the low-pass filter, while using the free space above the CMOS reading circuit of the semiconductor substrate.

When a metal material of Au, Al, or Cu is used as the material of the electrodes and the like which are stacked above the substrate 1, a usual process may be used in the formation of the low-pass filter.

Figure 7:
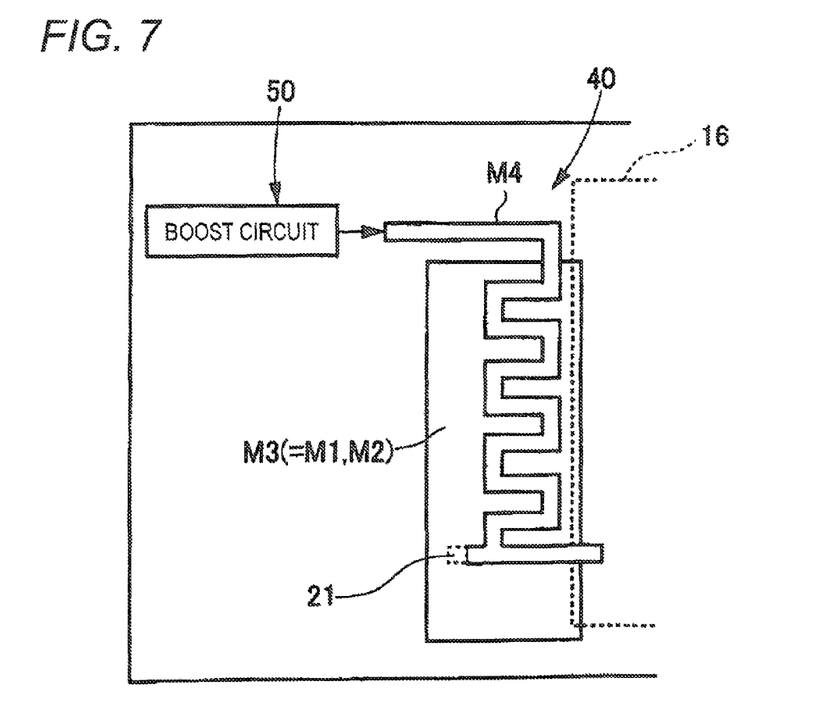
FIG. 7 is a schematic plan view showing a modification of the wiring portion.

FIG. 7 is a schematic plan view showing a modification of the wiring portion. As shown in FIG. 7, the wiring portion M4 may have a configuration where the resistivity is made higher by increasing the wiring length. When the wiring portion M4 is formed into a meander line shape as shown in FIG. 7, the wiring length may be further increased. The wiring portion M4 is disposed between the output of the boost circuit 50 and the upper electrode 16 (or the part which is partly extended from the upper electrode 16), and electrically connected to the parallel flat plates M1 to M3 which are in the lower side through the connecting portion 21.

Figure 8:
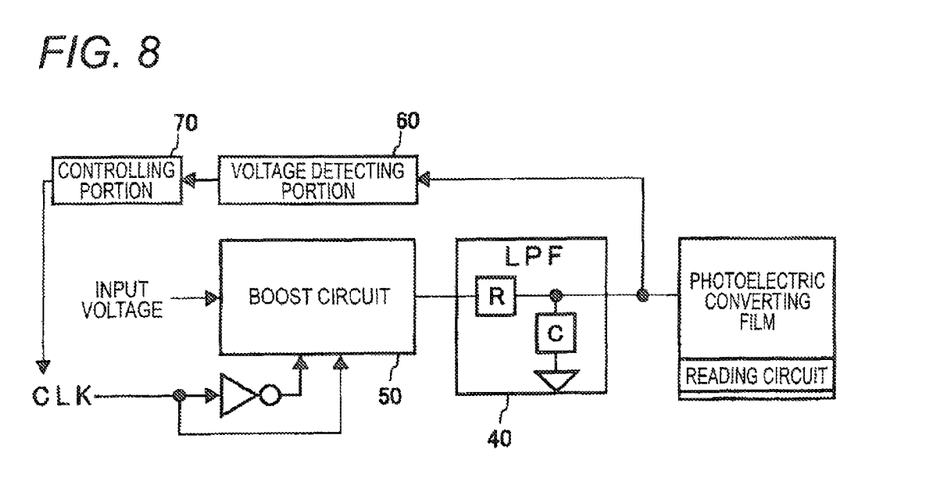
FIG. 8 is a block diagram illustrating the driving of the solid-state imaging device.

FIG. 8 is a block diagram illustrating the driving of the solid-state imaging device.

The boost circuit 50 boosts the input voltage by the boosting operation to produce a driving voltage, and outputs the driving voltage to the low-pass filter 40. The low-pass filter 40 blocks power supply noises contained in the driving voltage, and then supplies the driving voltage to the photoelectric converting film through the wiring portion and the upper electrode. When light is externally incident on the photoelectric converting film in a state where an electric field is applied between the upper and lower electrodes, charges are produced in the photoelectric converting film. The charges are read out to the reading circuit through the lower electrode 14, and then output as the output signal.

Furthermore, a voltage detecting portion 60 which is connected to the output of the low-pass filter 40, and which functions as a voltage detecting unit that detects the power supply voltage output from the boost circuit 50 is disposed in the solid-state imaging device. The solid-state imaging device further includes a controlling portion 70 which sets the clock frequency of the boost circuit so that the voltage detected by the voltage detecting portion 60 is within a predetermined range, and which controls the clock frequency input into the boost circuit 50 so as to coincide with the set clock frequency input.

Figure 9:
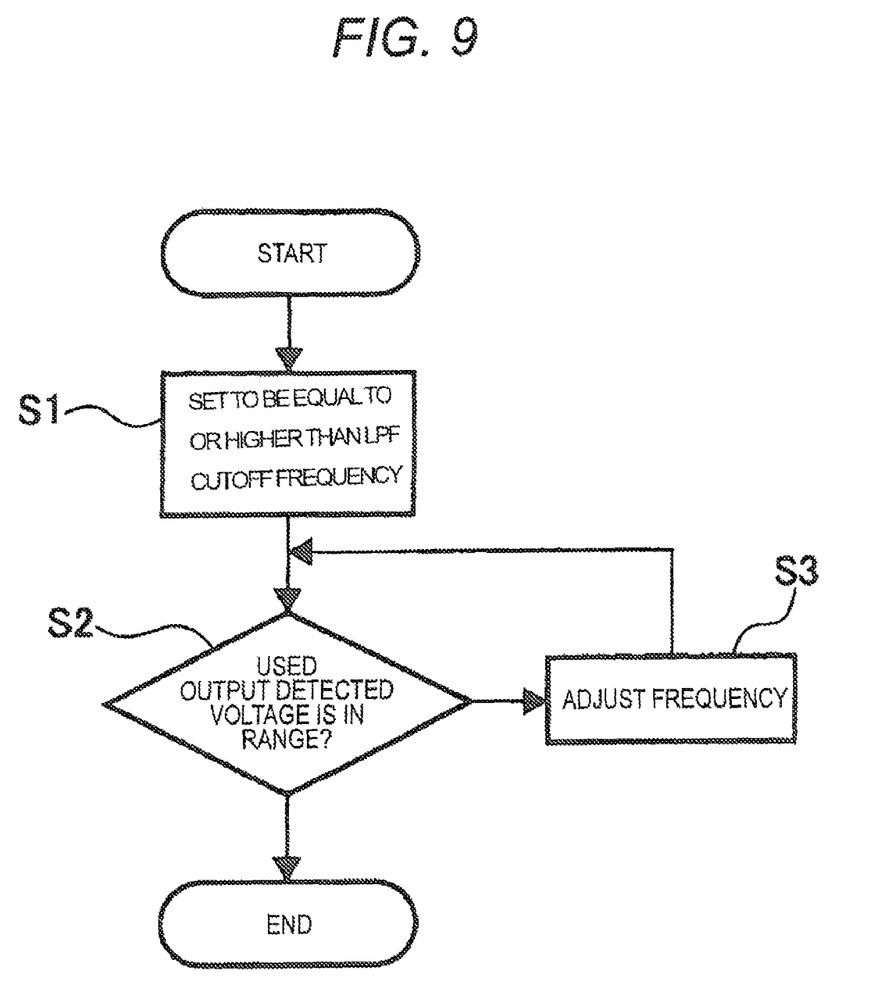
FIG. 9 is a flow chart showing the procedure of a control of a clock frequency.

FIG. 9 is a flow chart showing the procedure of the control of the clock frequency.

It is contemplated that the clock frequency is controlled by the method in which the control is performed at the following two timings. At one of the timings, an adjusting control is performed in shipment of a product, activation of the power supply, and initialization. The other timing is an output stop period (the horizontal blanking period or the like) of the imaging signal in an imaging process.

First, the clock frequency of the low-pass filter is set to be equal to or higher than the cutoff frequency (step S1).

Next, the voltage detecting portion 60 detects the driving voltage which is boosted by the boost circuit, and determines whether the detected driving voltage is within the desired range or not (step S2).

If the voltage detecting portion 60 determines that the driving voltage is within the desired range, the control of the clock frequency is ended.

If the voltage detecting portion 60 determines that the driving voltage is not within the desired range, the controlling portion 70 adjusts the clock frequency, sets a new clock frequency, and controls the clock frequency of the boost circuit (step S3). After the setting, the state where the driving voltage is detected is again maintained.

When the solid-state imaging device is configured so as to include the voltage detecting portion 60 and the controlling portion 70, the noise blocking effect of the low-pass filter may be enhanced, and noises may be blocked more surely.

In the above-described solid-state imaging device, a high power supply voltage may be supplied to the upper and lower electrodes 16, 14 by the boosting unit, and power supply noises caused by the boosting operation may be suppressed by the low-pass filter 40. The low-pass filter 40 has the configuration where a part of the wiring portion M4 which electrically connects the output of the boosting unit to the upper electrode 16 is formed as a resistor, and hence may be incorporated in the same substrate 1. As compared with the case where the low-pass filter 40 is disposed outside the substrate 1, therefore, the size of an IC chip including the solid-state imaging device 30 may be reduced.

What is claimed is:

1. A solid-state imaging device which is disposed on a substrate comprising;
   a lower electrode;
   a photoelectric converting layer that is disposed on the lower electrode;
   an upper electrode that is disposed on the photoelectric converting layer;
   a boosting unit that supplies a power supply voltage for producing an electric field between the upper electrode and the lower electrode;

a wiring portion that electrically connects the output of a boosting unit to the upper electrode; and a low-pass filter that is connected to the output of the boosting unit, and that includes a resistor that is formed by at least a part of the wiring portion.

2. The solid-state imaging device according to claim 1, wherein the substrate provides a sensor region including the photoelectric converting layer and a peripheral region where the sensor region is not disposed, and the boosting unit and the low-pass filter are disposed in the peripheral region.

3. The solid-state imaging device according to claim 1, wherein the wiring portion is formed into a meander line shape.

4. The solid-state imaging device according to claim 1, wherein the wiring portion includes a plurality of parallel flat plates which are electrically connected to one another, and which have gaps in a vertical direction of the substrate, and the plurality of parallel flat plates configure a capacitor of the low-pass filter.

5. The solid-state imaging device according to claim 1, further comprising:
    a voltage detecting unit that detects a power supply voltage output from the boosting unit; and
    a controlling portion that sets a clock frequency of the boosting unit so that the voltage detected by the voltage detecting unit is within a range, and that controls the clock frequency.

6. The solid-state imaging device according to claim 1, wherein the wiring portion is made of a material having a resistivity of $1\times10^{-7}$ Ωm or more.

7. The solid-state imaging device according to claim 1, wherein the wiring portion is made of titanium nitride or indium tin oxide.

8. The solid-state imaging device according to claim 1, wherein the wiring portion is configured by a same conductive material as the lower electrode.

9. An imaging apparatus which includes a solid-state imaging device according to claim 1.

10. A method of driving a solid-state imaging device which, on a substrate, includes a lower electrode, a photoelectric converting layer that is disposed on the lower electrode, and an upper electrode that is disposed on the photoelectric converting layer, the method comprising;
    controlling a clock frequency of a boosting unit by a low-pass filter in the substrate, wherein the low-pass filter includes a resistor that is formed by at least a part of a wiring portion which electrically connects an output of the boosting unit to the upper electrode:
    supplying a power supply voltage by the boosting unit in order to produce an electric field between the upper electrode and the lower electrode: and
    entering a light from an upper side of the upper electrode.

11. The method of driving a solid-state imaging device according to claim 10, wherein the substrate has a sensor region including the photoelectric converting layer and a peripheral region where the sensor region is not disposed, and the boosting unit, and the low-pass filter are disposed in the peripheral region.

12. The method of driving a solid-state imaging device according to claim 10, wherein the wiring portion is formed into a meander line shape.

13. The method of driving a solid-state imaging device according to claim 10, wherein the wiring portion includes a plurality of parallel flat plates which are electrically connected to one another, and which have gaps in a vertical direction of the substrate, and the plurality of parallel flat plates configure a capacitor of the low-pass filter.

14. The method of driving a solid-state imaging device according to claim 10, further comprising:
    detecting the power supply voltage output from the boosting unit;
    setting the clock frequency so that the detected voltage is within a range; and controlling the clock frequency.

15. The method of driving a solid-state imaging device according to claim 10, wherein the wiring portion is made of a material having a resistivity of $1\times10^{-7}$ Ωm or more.

16. The method of driving a solid-state imaging device according to claim 10, wherein the wiring portion is made of titanium nitride or indium tin oxide.

17. The method of driving a solid-state imaging device according to claim 10, wherein the wiring portion is configured by a same conductive material as the lower electrode.

* * * * *